Aug. 22, 1950 A. C. COUTANT ET AL 2,519,549
EXTENSIBLE LEG FOR TRIPODS
Filed Dec. 13, 1946 2 Sheets-Sheet 1

INVENTORS
Andre Clement Coutant
Jacques Mathot
By Robert E Burns
ATTORNEY

Aug. 22, 1950  A. C. COUTANT ET AL  2,519,549
EXTENSIBLE LEG FOR TRIPODS
Filed Dec. 13, 1946  2 Sheets-Sheet 2
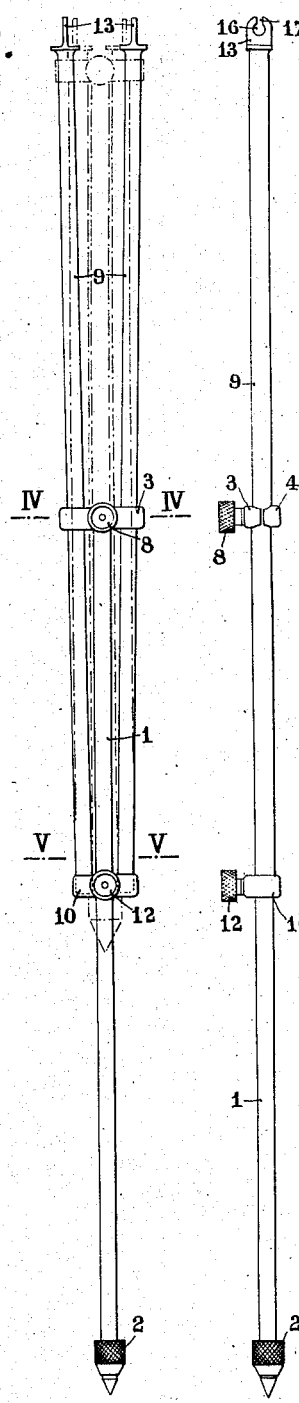
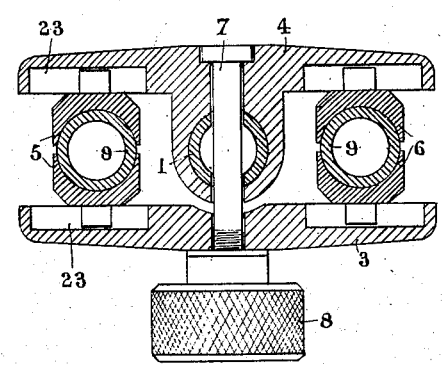
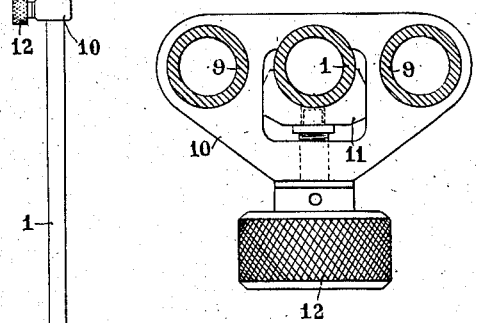
INVENTORS
Andre Clement Coutant
Jacques Mathot
By Robert E. Burns
ATTORNEY Patented Aug. 22, 1950

2,519,549

UNITED STATES PATENT OFFICE 2,519,549

EXTENSIBLE LEG FOR TRIPODS

André Clément Coutant and Jacques Mathot,
Paris, France

Application December 13, 1946, Serial No. 716,037
In France December 28, 1945

3 Claims. (Cl. 248—188)

This invention has for its object a tripod adapted to support picture-taking cameras, geodetical, levelling and like apparatus and departing from usual extensible tripods by particular arrangements intended to secure increased stiffness and strength as well as quicker dismounting without the liability to loss of nuts or other connecting parts.

These arrangements will be described with reference to the appended drawing in which an embodiment of a tripod according to the invention is shown by way of example.

Figure 2 shows one of the legs in front elevational view.

Figure 3 is a side elevational view.

Figures 4 and 5 are enlarged cross-sectional views taken on lines IV—IV and V—V in Fig. 2.

Figures 1, 6:
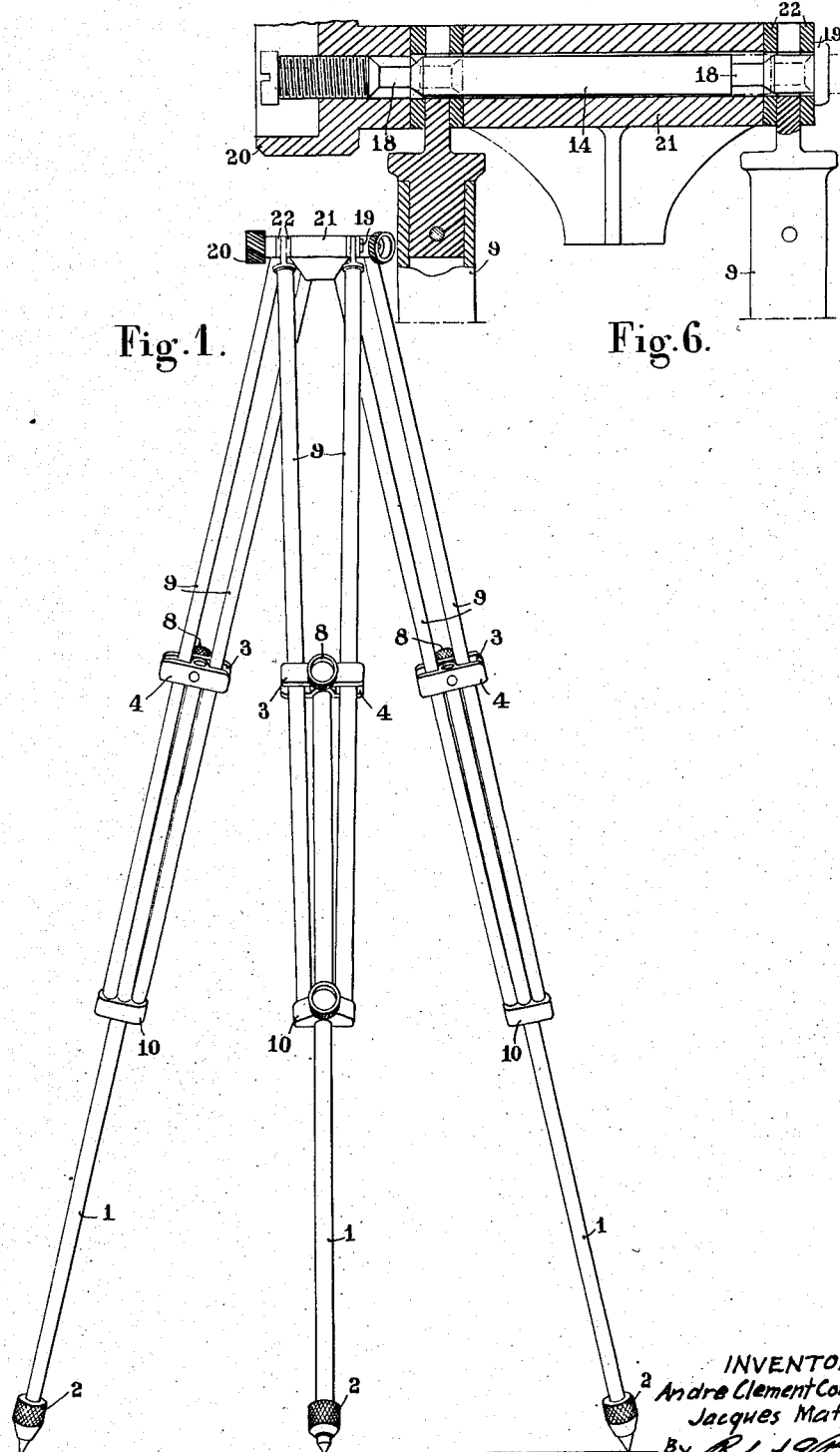
Figure 1 is an elevational view of the whole tripod.
Figure 6 is a fragmentary sectional view of the head taken on the fulcrum axis of one leg as the latter is being disconnected.

Each leg comprises two members adapted to slide with respect to each other and to be fixed in their various relative positions.

The lower member consists in a tube 1 ending at the bottom thereof in a point 2 and whose upper end carries clamping means composed of a pair of cross bars 3, 4, clamping jaws 5, 6, a screw 7 projecting through the pair of cross bars and the top end of the tube and a knurled nut 8.

On the other hand, the upper member is comprised of a pair of tubes 9 whose bottom ends are undetachably fitted in a cross bar 10 slidably mounted on the tube 1 and adapted to be fastened at any desired point on said tube with the aid of a jaw 11 and a clamping screw 12 provided with a knurled head.

The upper extremities of the tubes 9 end in hinge lugs 13 designed for easily dismountable connection with a pintle 14 received in one of the sides of the head 21 of the tripod. For that purpose, each of the said lugs is drilled with a hole 16 corresponding to the diameter of the pintle 14 and extending upwards in a narrower slot 17 corresponding to the diameters of a pair of grooves 18 provided adjacent to the ends of said pintle, one of said ends being formed with a head 19 and the other being screwthreaded and carrying a nut 20.

Each pintle 14 is slidably received in one side of the head 21 on which photographic or like apparatus above referred to are supported.

In the arrangement illustrated in Fig. 6 one of the lugs 13 is clamped between the head 21 and the head 19 and the other lug between the head and the nut 20; preferably, washers 22 made of plastics are interposed between the bearing faces of said members to provide for a certain amount of friction; it will be appreciated that the lugs then engage unrestricted portions of the pintle 14 and consequently cannot escape therefrom even if nut 20 should happen to be somewhat loose. Yet, with screw 20 sufficiently loosened, it is possible to move the pintle 14 to the position indicated in broken lines, in which both of grooves 18 are positioned at either side of the head 21; the lugs 13 can then be disengaged freely due to the provision of the slots 17 therein and the leg can be detached immediately from the head.

The drawing shows that instead of the tubes 9 belonging to one and the same leg running parallel with each other they may slightly converge, whereby the cross bar can be made as short as possible and the hinge base of the leg on the axis of 20 as wide as possible; it follows that once the leg is detached from the tablet the two tubes 9 can be pulled together against tube 1 as illustrated in broken lines in Fig. 2 for the purpose of making the detached leg as compact as possible.

With this end in view it is necessary to provide for variability in the distance between jaws 5 and 6 as the cross bars are moved along the tubes 9 where same are convergent; for that purpose said jaws are slidably mounted in said cross bars due to grooves 23 being provided therein or to any other suitable provision; with the nut 8 loose the jaws 5 and 6 can thus move towards or away from each other as the tube 1 is moved out or in between the diverging tubes 9.

Owing to the comparatively large width that can be given to the hinge base of each leg maximum stiffness and stability of the tripod can be obtained without it being necessary to clamp each leg to the tripod head 21.

The unscrewing of screw 12 and nuts 8 and 20 may be stopped automatically by any suitable arresting means so that none of said parts can be detached and get lost.

Of course, all the details of construction may be varied and the various parts replaced by substantially equivalent ones without thereby departing from the invention. In particular, the tubes 1 and 9 may be replaced by solid or hollow rods having any suitable section.

What we claim is:

1. In an extensible leg comprising two members adapted to slide with respect to each other and to be fixed in their various relative positions, and of which the first one comprises at least two longitudinal rods, a cross bar slidably mounted on the second member, to either side end of which, one end of one of these rods is secured, clamping means attached to one end of the second member adapted to clamp the first member and comprising a pair of cross bars, a bolt extending through said cross bars and jaws slidably mounted on said cross bars at right angles to the general direction of the leg and adapted to clamp the aforesaid rods of the first member by the action of the said bolt.

2. An extensible leg comprising a lower member, an upper member composed of a pair of tubes, a cross bar slidably mounted on the lower member, to either side end of which the lower end of one of these tubes is secured, and clamping means arranged between the lower member and the upper member comprising a pair of cross bars one of which is rigid with the upper end of the lower member, a pair of jaws slidably mounted on said cross bars at right angles to the general direction of the leg adapted to clamp the rods of the upper member therebetween and means to bring the cross bars towards each other and to clamp the tubes of the upper member between said jaws.

3. An extensible leg according to claim 2 wherein each jaw element is formed with a guide and each cross bar with a groove in which said guide can slide in its movement at right angles to the general direction of the leg.

ANDRÉ CLÉMENT COUTANT.
JACQUES MATHOT.

REFERENCES CITED

The following references are of record in the file of this patent:

UNITED STATES PATENTS

| Number | Name | Date |
|---|---|---|
| 939,859 | Pullen | Nov. 9, 1909 |
| 1,394,691 | Spence | Oct. 25, 1921 |
| 1,598,943 | Tessier | Sept. 7, 1926 |
| 1,863,761 | Neuwirth | June 21, 1932 |